JOHN W. HAINES.
Improvement in Clasps for Securing Knobs to their Shanks.
No. 126,805.  Patented May 14, 1872.
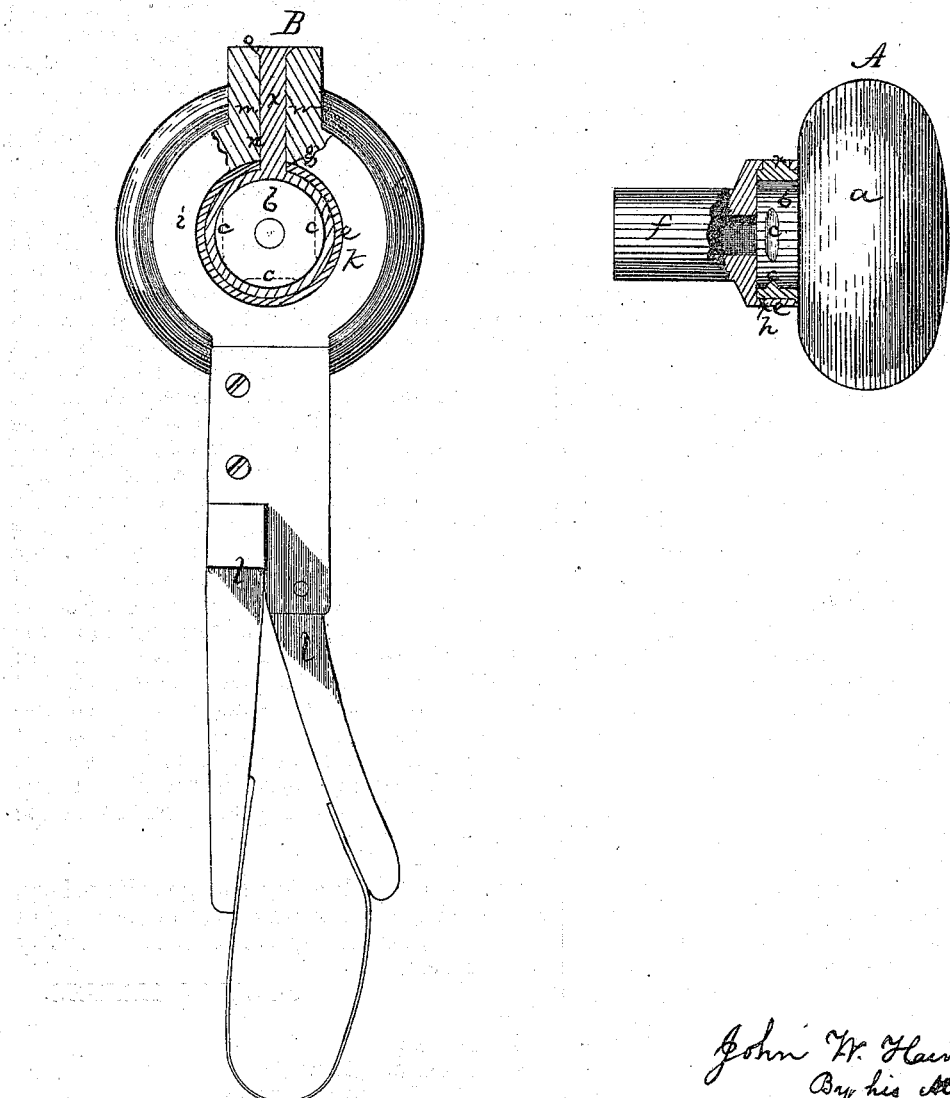

126,805

UNITED STATES PATENT OFFICE.

JOHN W. HAINES, OF CAMBRIDGE, MASSACHUSETTS.

IMPROVEMENT IN CLASPS FOR SECURING KNOBS TO THEIR SHANKS.

Specification forming part of Letters Patent No. 126,805, dated May 14, 1872.

*To all whom it may concern:*

Be it known that I, JOHN W. HAINES, of Cambridge, in the county of Middlesex and State of Massachusetts, have invented an Improvement in Joining Glass Door-Knobs to Metal Sockets; and I do hereby declare that the following, taken in connection with the drawing which accompanies and forms part of this specification, is a description of my invention sufficient to enable those skilled in the art to practice it.

In the manufacture of glass door-knobs it is customary to use a metal socket, into one end of which the glass pin of the knob is inserted, the other end having a shallow recess, and there being holes in the web, through which melted lead is poured, the lead running into depressions in the side of the pin and acting as a key to hold the parts together. In some styles of sockets, made of white metal and plated, (the plating being done before the connection of the knob and socket,) it is impracticable to pour the lead from a ladle directly into the hole in the socket-flange, as the solder will run down upon the outer surface of the flange and ruin or mar the plating. To remedy this I use a metal clasp having two half rings, which embrace and circumscribe the flange, the half rings being forced together by a suitable spring, and their outer ends having two jaws, in the adjacent surfaces of which are two half-round grooves, said grooves forming together a round tube, the mouth of which is made flaring. To connect the knob-pin and socket they are brought together or into proper relative position, and the flange is introduced into the half rings, which are closed upon it, the flange being so turned as to bring its hole directly beneath the jaw-tube. The lead or solder is now poured into the tube, through which it will run into and through the socket-flange hole, filling the recesses in the pin, the space between the pin and flange, and the flange-hole, and also forming a pin, $x$, over the hole in the jaw-tube, which pin may be subsequently severed flush with the outer surface of the flange. The half rings form complete shields for the flange, preventing the lead from running upon the outer surface thereof, and thereby protecting the flange from injury. This method constitutes another feature of my invention.

The drawing represents a knob and socket and the method of connecting them. A shows the socket in central section. B is a section on the line $x\ x$. $a$ denotes the glass knob; $b$, the pin at its inner side; $c\ c$, the recesses in the surface of the pin. $e$ is the flange of the metal socket; $f$, the neck extending from the socket, into which neck the latch-spindle extends. $g$ is the lead-entering hole, through which the melted lead passes to fill the recesses $c\ c$ and the space $h$ between the flange and the pin. $i\ k$ denote the two half rings which clasp the socket, the shanks $l$ of the half rings being connected together, and the half rings being forced together by the stress of a suitable spring, and being opened by pressing together the ends of the shanks against the stress of the spring. At the upper end of each half ring is a jaw, $m$, and in each jaw the groove $n$, the two grooves forming the tube having the flaring mouth $o$. The two half rings being made to encircle the socket, and the pin being in the socket, and the socket-hole brought under the tube, lead is poured into the tube and the connection of the parts effected as before described, the rings insuring the protection of the outer surface of the flange $e$.

I claim—

The socket embracing and guarding-clasp, composed of the half rings $i\ k$, the jaws $m$, and the tube $n$, formed by the jaws, substantially as described.

JOHN W. HAINES.

Witnesses:
FRANCIS GOULD,
M. W. FROTHINGHAM.